United States Patent
Ur et al.

(10) Patent No.: US 11,699,147 B2
(45) Date of Patent: Jul. 11, 2023

(54) SYSTEM AND METHOD OF PERFORMING SECURED TRANSACTIONS IN A COMMUNICATION NETWORK

(71) Applicant: Source Ltd., Valletta (MT)

(72) Inventors: Shmuel Ur, Shorashim (IL); Guy Roth, Rehovot (IL)

(73) Assignee: Source Ltd., Valletta (MT)

( * ) Notice: Subject to any disclaimer, the term of this patent is extended or adjusted under 35 U.S.C. 154(b) by 0 days.

(21) Appl. No.: 17/029,232

(22) Filed: Sep. 23, 2020

(65) Prior Publication Data

US 2022/0092583 A1   Mar. 24, 2022

(51) Int. Cl.
*G06Q 20/36* (2012.01)
*G06Q 20/42* (2012.01)
(Continued)

(52) U.S. Cl.
CPC ......... *G06Q 20/3674* (2013.01); *G06F 3/167* (2013.01); *G06F 9/451* (2018.02); *G06N 20/00* (2019.01); *G06Q 20/02* (2013.01); *G06Q 20/0655* (2013.01); *G06Q 20/108* (2013.01); *G06Q 20/3829* (2013.01); *G06Q 20/40145* (2013.01); *G06Q 20/42* (2013.01); *G06Q 40/04* (2013.01); *G10L 15/18* (2013.01); *G10L 15/22* (2013.01); *G10L 19/00* (2013.01);
(Continued)

(58) Field of Classification Search
None
See application file for complete search history.

(56) References Cited

U.S. PATENT DOCUMENTS 8,204,044 B2 * 6/2012 Lebizay ............ H04L 65/1043
370/254
2002/0132612 A1 * 9/2002 Ishii ..................... H04L 9/40
455/414.1
(Continued)

FOREIGN PATENT DOCUMENTS

WO     WO-0167671 A2 *  9/2001  ........... G10L 19/018

OTHER PUBLICATIONS

Sorensen, "Different types of mobile payments explained", https://www.mobiletransaction.org/different-types-of-mobile-payments/, retrieved from the Internet on Oct. 5, 2020.
(Continued)

*Primary Examiner* — John W Hayes
*Assistant Examiner* — Ari Shahabi
(74) *Attorney, Agent, or Firm* — Pearl Cohen Zedek Latzer Baratz LLP

(57) ABSTRACT

A system and a method of data communication between a first computing device, associated with a first user, and at least one second computing device associated with a second user may include: receiving, by the first computing device, one or more data elements pertaining to details of a transaction request from the second computing device, via a voice channel; extracting said transaction request details by the first computing device; transmitting, by the first computing device, one or more authentication data elements of an electronic wallet module, comprised in the first computing device, to the second computing device, via the voice channel; and carrying out the requested transaction by the first computing device, based on the extracted transaction request details and the electronic wallet authentication data.

8 Claims, 8 Drawing Sheets

(51) Int. Cl.
G06Q 20/40 (2012.01)
G06Q 20/02 (2012.01)
G06Q 20/10 (2012.01)
G06Q 20/06 (2012.01)
G06Q 20/38 (2012.01)
G06Q 40/04 (2012.01)
H04L 9/32 (2006.01)
G06N 20/00 (2019.01)
G10L 19/00 (2013.01)
G10L 15/18 (2013.01)
G10L 15/22 (2006.01)
G06F 3/16 (2006.01)
G06F 9/451 (2018.01)
H04M 7/00 (2006.01)

(52) U.S. Cl.
CPC ......... *H04L 9/321* (2013.01); *G06Q 20/3678* (2013.01); *G06Q 2220/00* (2013.01); *G10L 2015/223* (2013.01); *H04L 2209/56* (2013.01); *H04M 7/006* (2013.01)

(56) References Cited

U.S. PATENT DOCUMENTS

| | | | | |
|---|---|---|---|---|
| 2008/0046366 | A1* | 2/2008 | Bemmel | G06Q 40/12 |
| | | | | 705/44 |
| 2008/0049915 | A1* | 2/2008 | Tsai | H04M 1/72406 |
| | | | | 379/90.01 |
| 2014/0101043 | A1* | 4/2014 | Cincera | G06Q 20/425 |
| | | | | 705/44 |
| 2020/0356989 | A1* | 11/2020 | Shamai | H04L 9/0833 |
| 2020/0359210 | A1* | 11/2020 | Akkad | G06F 40/143 |
| 2021/0314638 | A1* | 10/2021 | Gordon | H04N 21/44224 |

OTHER PUBLICATIONS

Pradhan, "ToneTag's Sound Wave-Based Digital Payments Tech Is Making All The Right Noises", https://inc42.com/startups/tonetags-sound-wave-based-digital-payments-tech-is-making-all-the-right-noises/, retrieved from the Internet on Oct. 5, 2020.

Bora, "This Amazon-backed startup makes digital payment possible without Internet", https://economictimes.indiatimes.com/small-biz/startups/features/this-amazon-backed-startup-makes-digital-payment-possible-without-internet-tonetag/articleshow/71042246.cms?from=mdr, retrieved from the Internet on Oct. 5, 2020.

https://www.tonetag.com/payment/, retrieved from the Internet on Oct. 5, 2020.

https://www.paymentvision.com/payment-services/channels/ivr-bill-pay, retrieved from the Internet on Oct. 5, 2020.

https://www.e-complish.com/blogs/what-is-ivr-payment-processing/, retrieved from the Internet on Oct. 5, 2020.

* cited by examiner

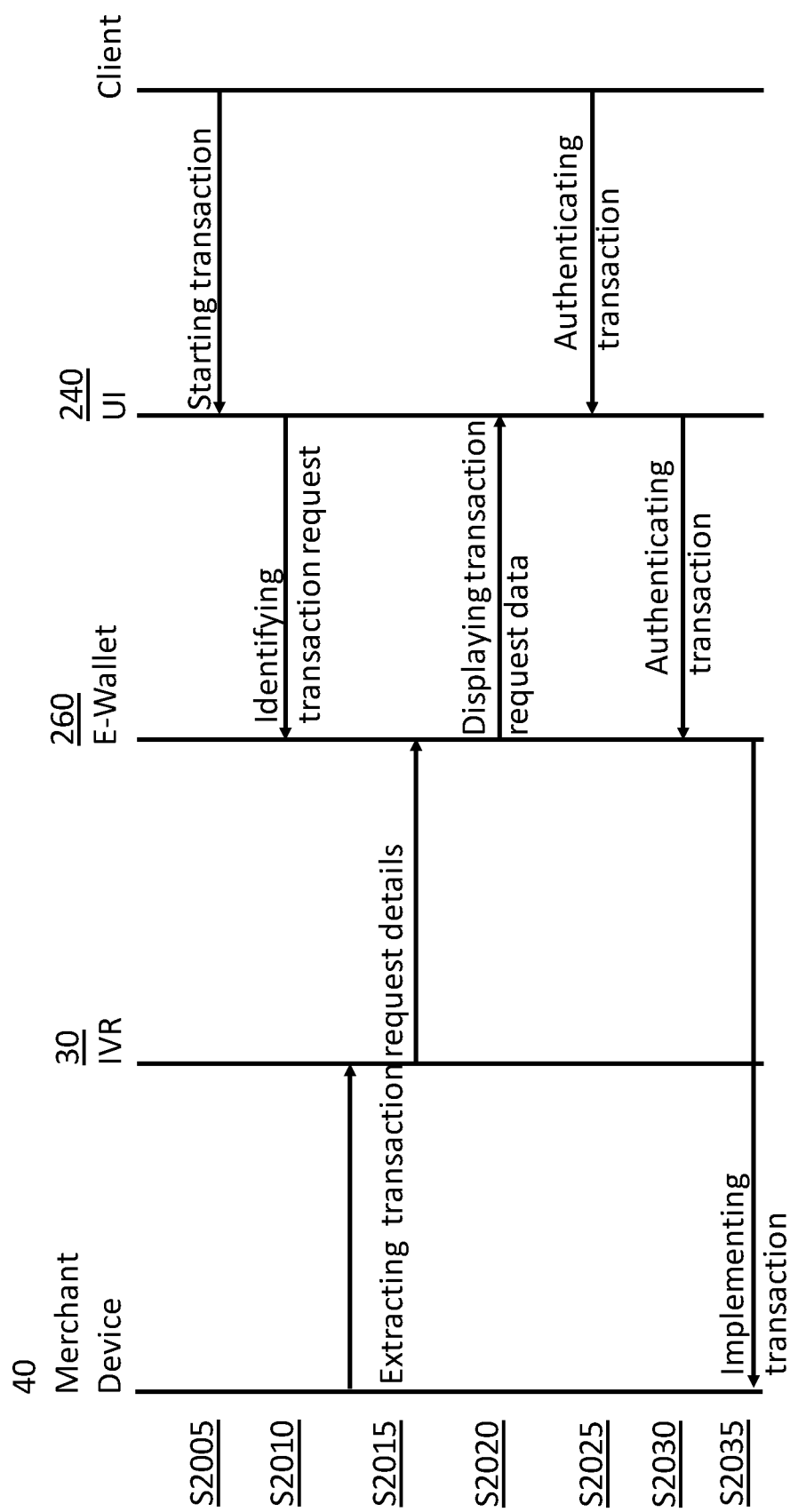

SYSTEM AND METHOD OF PERFORMING SECURED TRANSACTIONS IN A COMMUNICATION NETWORK

FIELD OF THE INVENTION

The present invention relates generally to computer communication networks. More specifically, the present invention relates to systems for exchanging data to perform, by at least one processor, a secure transaction between computing devices in a network.

BACKGROUND OF THE INVENTION

The use of electronic wallets, associated with personal, mobile computing devices such as smart mobile phones has become ubiquitous. Clients may use the technology of electronic wallets to exchange data which easily and rapidly effects monetary transactions without having to rely on the underlying mechanisms of payment means such as payment cards (e.g., debit cards, credit cards, etc.), and without the need to carry payment means such as cash currency or payment cards.

However, as clients may communicate, and negotiate their monetary transactions with merchants via a mobile device voice channel, the use of electronic wallets is still limited to other forms of machine-to-machine communication protocols, that may be disassociated from voice communication. For example, a client may discuss a purchase of goods with a merchant, and may need to carry out or implement payment for the purchased goods as agreed with the merchant via a second channel, such as a cellular data channel, a near field communications (NFC) channel, and the like. In this example, information that was included in a voice conversation between a client and a merchant may not be available after the call is terminated and may need to be inserted by a user (e.g., the client or the merchant) at that time. Moreover, the inserted data may be erroneous or different from information that was included in the conversation.

SUMMARY OF THE INVENTION

A system and method of automatically creating and exchanging computer data for carrying out transactions via a voice channel, e.g., as part of, or during a voice conversation between two people is desired. As elaborated herein, embodiments of the invention may be configured to, for example, monitor or tap into a conversation between a first person and a second person over a voice communication channel; identify an initiation of a transaction; extract details pertaining to the transaction from the conversation; present the extracted details for confirmation; carry out the transaction via the voice communication channel; and verify the correctness of the transaction in view of the information conveyed during the conversation.

Embodiments of the invention may include a method of data communication between a first computing device, associated with a first user (e.g., a client or customer user), and at least one second computing device associated with a second user (e.g., a merchant user). Embodiments of the method may include: receiving, by at least one processor of the first computing device, one or more data elements pertaining to details of a transaction request from the second computing device, via a voice channel; extracting said transaction request details by the at least one processor; transmitting, by the at least one processor, one or more authentication data elements of an electronic wallet module, comprised in the first computing device, to the second computing device, via the voice channel; and carrying out the requested transaction by the at least one processor, based on the extracted transaction request details and the electronic wallet authentication data.

According to some embodiments of the invention, the at least one processor may receive an indication of a forthcoming transaction request via a user interface (UI); and may transfer or put at least one module of the first computing device (e.g., the electronic wallet module, and/or a machine-learning based natural language processing (NLP) module, as elaborated herein) into a tapping state, based on the received indication, so as to tap onto the voice channel, and extract the transaction request details. Additionally, or alternatively, the at least one processor may receive an indication of a forthcoming transaction request from the second computing device, via the voice channel by the ML-based NLP module, as elaborated herein, and may subsequently transfer the electronic wallet module into a tapping state, based on the received indication, so as to tap onto the voice channel, and extract the transaction request details.

According to some embodiments of the invention, the at least one processor may present the transaction request details on a UI of the first computing device; receive the first user's consent to the presented transaction request details via the UI; and communicate the electronic wallet module authentication data based on the first user's consent.

Additionally, or alternatively, the at least one processor may biometrically authenticate an identity of the first user. According to some embodiments, the at least one processor may transmit the one or more electronic wallet authentication data elements to the second computing device based on the first user's consent and/or based on the first user's biometric identity authentication.

As elaborated herein, the at least one processor may be associated with a ML-based NLP module. The at least one processor may extract the transaction request details by employing the NLP model to analyze audio data that may be conveyed or communicated over the voice channel, so as to extract the transaction request details from the audio data.

According to some embodiments, the voice channel may be adapted to convey an audio signal between the first computing device and the at least one second computing device, and the one or more data elements of transaction request details may be transmitted from the second computing device to the first computing device as a steganographic audio signal over the voice channel.

Additionally, or alternatively, the one or more authentication data elements of the electronic wallet module may be transmitted from the first computing device to the second computing device as a steganographic audio signal over the voice channel.

According to some embodiments, the voice channel may be a voice over internet protocol (VoIP) channel. The one or more data elements of transaction request details may be transmitted from the second computing device to the first computing device over the voice channel as steganographic data in the VoIP datapackets. Additionally, or alternatively, the one or more authentication data elements of the electronic wallet module may be transmitted from the first computing device to the second computing device over the voice channel as a steganographic data in the VoIP datapackets.

According to some embodiments, carrying out the requested transaction may include, for example, propagating at least one transaction data element from the second computing device to a third computing device, associated with an issuing entity of the electric wallet; and transferring funds from a first account, associated with the first user, to a second account, associated with the second user, via the third computing device, based on the at least one transaction data element. The at least one transaction data element may include, for example, the transaction request details, the authentication data, and an identification of a paying card associated with the electronic wallet.

Additionally, or alternatively, the one or more authentication data elements of the electronic wallet module may include a cryptocurrency cryptographic key. In such embodiments, carrying out the requested transaction may include transferring cryptocurrency funds from a first account, associated with the first user, to a second account, associated with the second user, based on the cryptographic key.

Embodiments of the invention may include a method of data communication between a first computing device, associated with a first user (e.g., a client or customer user), and at least one second computing device associated with a second user (e.g., a merchant user). Embodiments of the method may include: transmitting, by at least one processor of the second computing device, one or more data elements pertaining to details of a trans action request from the first computing device, via a voice channel; receiving, via the voice channel, one or more data elements pertaining to authentication data of an electronic wallet module, comprised in the first computing device; and carrying out the requested transaction by the at least one processor, based on the transaction request details and the electronic wallet authentication data.

According to some embodiments of the invention, transmitting the one or more transaction request details data elements may include encoding the one or more data elements of transaction request details within an audio signal, and transmitting the audio signal over the voice channel.

According to some embodiments of the invention, the transaction request details may be verbally spoken between the first user and the second user via the voice channel. The second computing device may be associated with an ML-based NLP model, configured to monitor the voice channel, and extract the spoken transaction request details from the voice channel. The at least one processor of the second computing device may be adapted to encode the extracted transaction request details as data elements within the audio signal.

Embodiments of the invention may include a system of data communication between a first computing device, associated with a first user (e.g., a client or customer user) and at least one second computing device associated with a second user (e.g., a merchant user). Embodiments of the system may include an electronic wallet module, associated with the first device; a first encoder-decoder (CODEC) module, associated with the first computing device; and a second CODEC module, associated with the second computing device. The second computing device may be adapted to communicatively connect to the first computing device via a voice channel. The second CODEC module may be adapted to encode, as part of an audio signal, at least one data element, that may include details of a transaction request and communicate the audio signal to the first computing device via the voice channel. The first CODEC module may be adapted to extract the transaction request details from the audio signal, and the electronic wallet module may be adapted to receive the transaction request details from the first CODEC module and communicate at least one authentication data element, pertaining to the electronic wallet module to the second computing device, over the voice channel, so as to carry out the requested transaction, based on the extracted transaction request details.

According to some embodiments of the invention, the first CODEC may be associated with a machine learning based NLP model, and the ML-based NLP model may be configured to: monitor a first audio signal that may be communicated over the voice channel; extract the at least one transaction request data element from the monitored audio signal; and provide the at least one transaction request data element to the second CODEC to be encoded as part of a second audio signal.

Embodiments of the invention may include a first computing device for data communication, comprising: at least one processor, an electronic wallet module; and a CODEC module.

According to some embodiments, the at least one processor may be configured to: receive, via a voice channel, from a second computing device, at least one data element comprising details of a transaction request, wherein said transaction request data element is encoded within a first audio signal in the voice channel; use the CODEC module to decode the first audio signal, so as to extract the transaction request details from the first audio signal; transfer the extracted transaction request details to the electronic wallet module, and receive at least one authentication data element as a response; and communicate the at least one authentication data element to the second computing device, as a second audio signal over the voice channel, to carry out the requested transaction, as elaborated herein.

According to some embodiments, the transaction request details may be verbally spoken between a first user of the first computing device and a second user the second computing device via the voice channel. The first computing device may be associated with an interactive voice recognition (IVR) module that may include an ML-based NLP model. The ML-based NLP model may be configured to monitor the voice channel and extract the spoken transaction request details from the voice channel. The IVR module may in turn encode the extracted transaction request details as data elements within the first audio signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3A and 3B are communication diagrams, depicting examples of scenarios of exchanging computer data regarding secured transactions, between nodes of a communication network, according to some embodiments of the invention.

Figure 1:
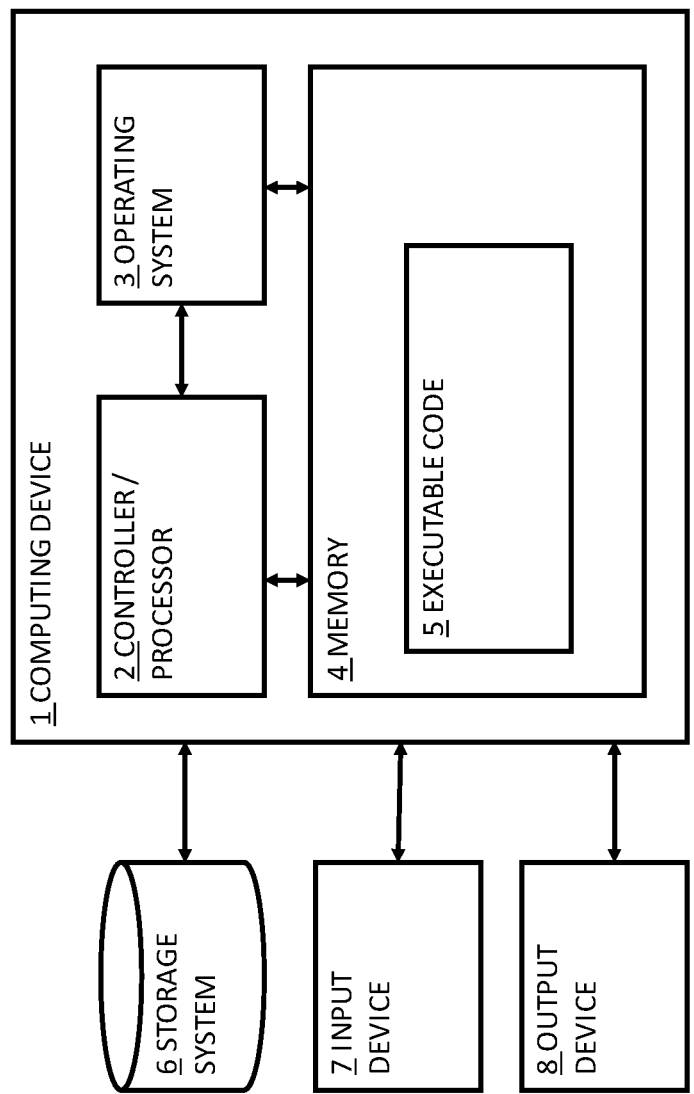
FIG. 1 is a block diagram, depicting a computing device which may be included in a system for creating and exchanging computer data regarding secured transactions in a communication network, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for performing secured transactions in a communication network.

The following table, Table 1, includes a list of terms used throughout this document, alongside respective explanations of the terms, for the reader's convenience.

TABLE 1

| | |
|---|---|
| Node | The term 'Node' may be used herein to refer to a computing device, that may be used for processing and/or routing computer data describing transactions within a computer network of nodes. Nodes may include, for example: an individual computer such as a smartphone device, a server in an organization and a site operated by an organization. For example, in a non-limiting example of a monetary exchange transaction, nodes may include a computing device (e.g., a smartphone) of a first person (e.g., a client), a computing device associated with a second person (e.g., a merchant), a server in a banking system, a computer of a paying-card issuer, and the like. |
| Transaction | The term 'transaction' may be used herein to refer to communication or exchange of data between a source node and a destination node of a computer network. According to some embodiments, transactions may include a single, one-way transfer of data between the source node and the destination node. For example: a first server may propagate at least one data file to a second server as a payload within a transaction. Alternatively, transactions may include a plurality of data transfers between the source node and the destination node. For example, a transaction may be or may include a monetary exchange between two institutions (such as banks), operating computer servers and computer equipment, where in order to carry out the transaction, data needs to be transferred between the servers and other computer equipment operated by the institutions. |
| Transaction payload | The term 'payload' may be used herein to refer to at least one content of a transaction that may be sent from the source node to the destination node. Payloads may include, for example: information included within a transaction, such as parameters of a financial transaction (e.g., a sum and/or currency of a monetary exchange), a data file sent over the transaction, etc. |
| Transaction request | The term "Transaction request" may be used herein to refer to a request placed by a user, for a transaction between a source node and a destination node of a computer network. For example, a user may initiate a monetary exchange transaction (e.g., to transfer |

TABLE 1-continued

|  |  |
|---|---|
|  | funds) from a source node to a destination node, by sending a transaction request from the destination node to the source node. The source node may subsequently react to the transaction request by performing the requested monetary exchange transaction, and transferring the required funds, as elaborated herein. |
| Neural network | The term neural network (NN), e.g. a neural network implementing machine learning, may refer to an information processing paradigm that may include nodes, referred to as neurons, organized into layers, with links between the neurons. The links may transfer signals between neurons and may be associated with weights. ANN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. central processing units (CPUs) or graphics processing units (GPUs), or a dedicated hardware device may perform the relevant calculations. |
| Steganography, steganographic data | The term "Steganography" and "steganographic data" may be used herein to refer to a manner of including or concealing a first data element of a first type, within a transmission of a second data element of a second type. For example, embodiments of the invention may exchange data elements such as security keys and/or transaction request details, concealed in, or included within voice data and/or audio signals, to carry out transactions as elaborated herein. |

Reference is now made to FIG. 1, which is a block diagram depicting a computing device, which may be included within an embodiment of a system for creating and exchanging computer data regarding secured transactions in a communication network, according to some embodiments.

Computing device 1 may include a processor or controller 2 that may be, for example, a CPU processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules (e.g. an electronic wallet module, a CODEC module, an ML module, an NLP model, etc.), servers, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., aRAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may exchange data to perform secured transactions in a communication network as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to performance of data trans actions over a communication network may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2A:
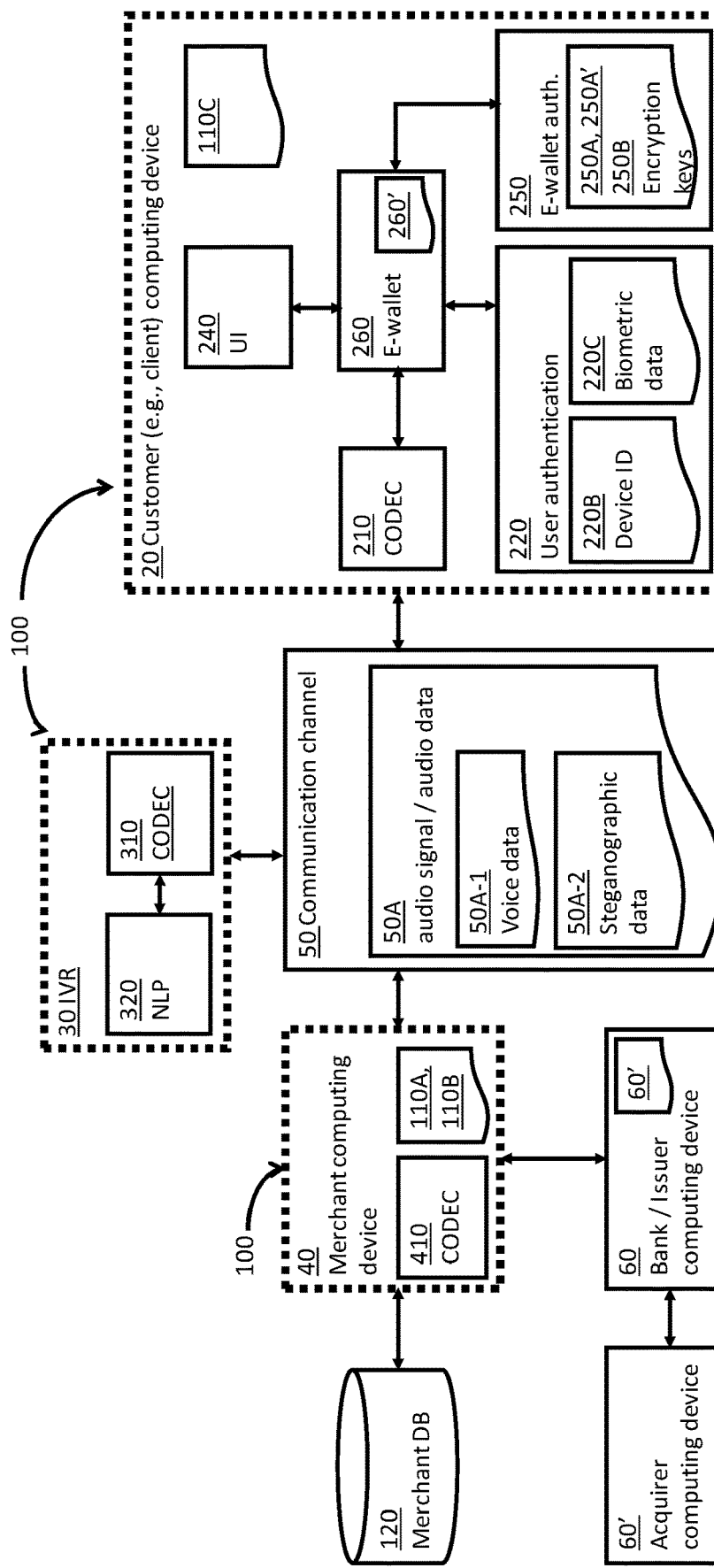
FIGS. 2A, 2B and 2C are block diagrams depicting different implementations of systems for creating and exchanging computer data regarding secured transactions in a communication network, according to some embodiments of the invention.
Figure 2B:
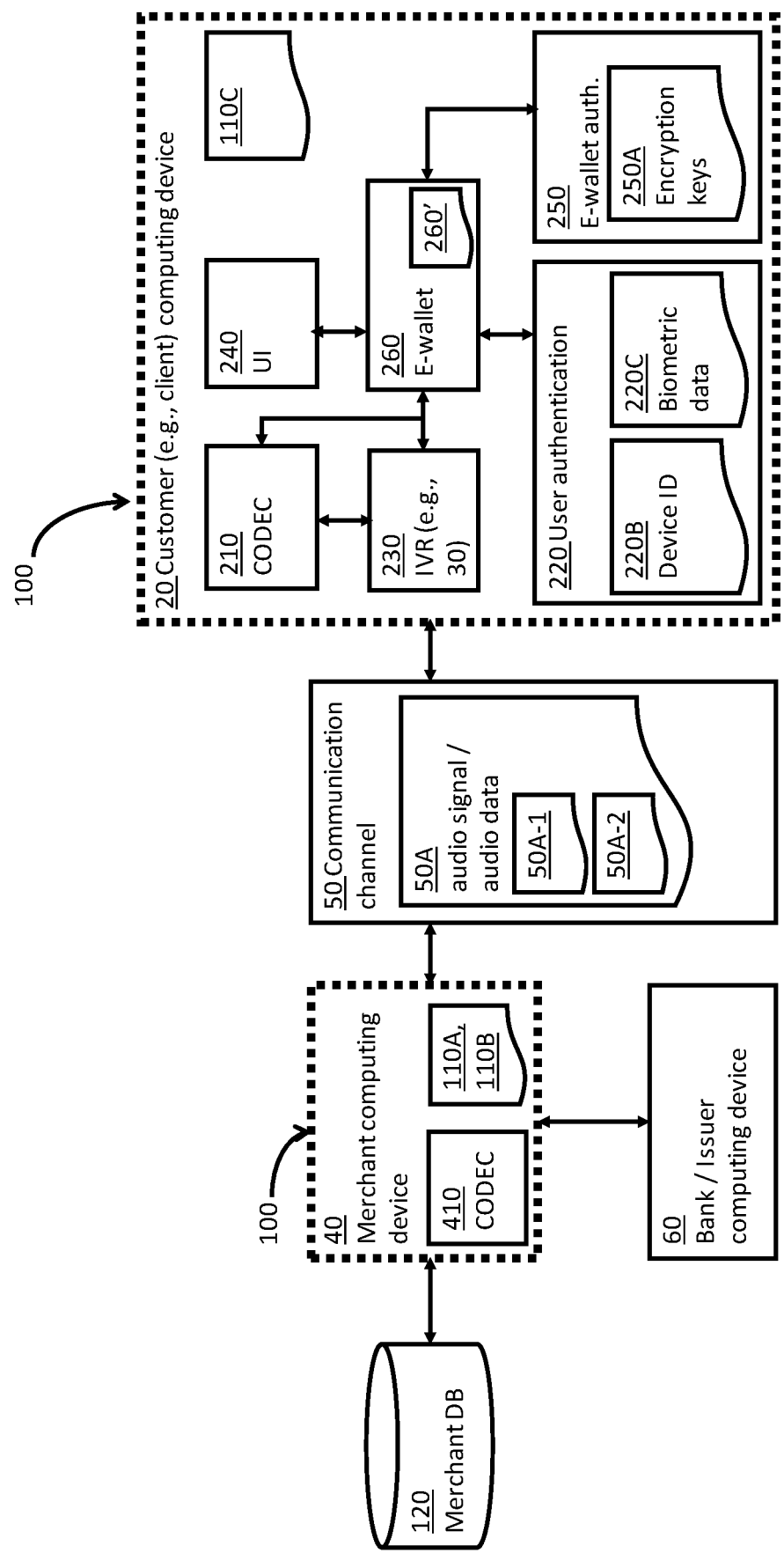
Figure 2C:
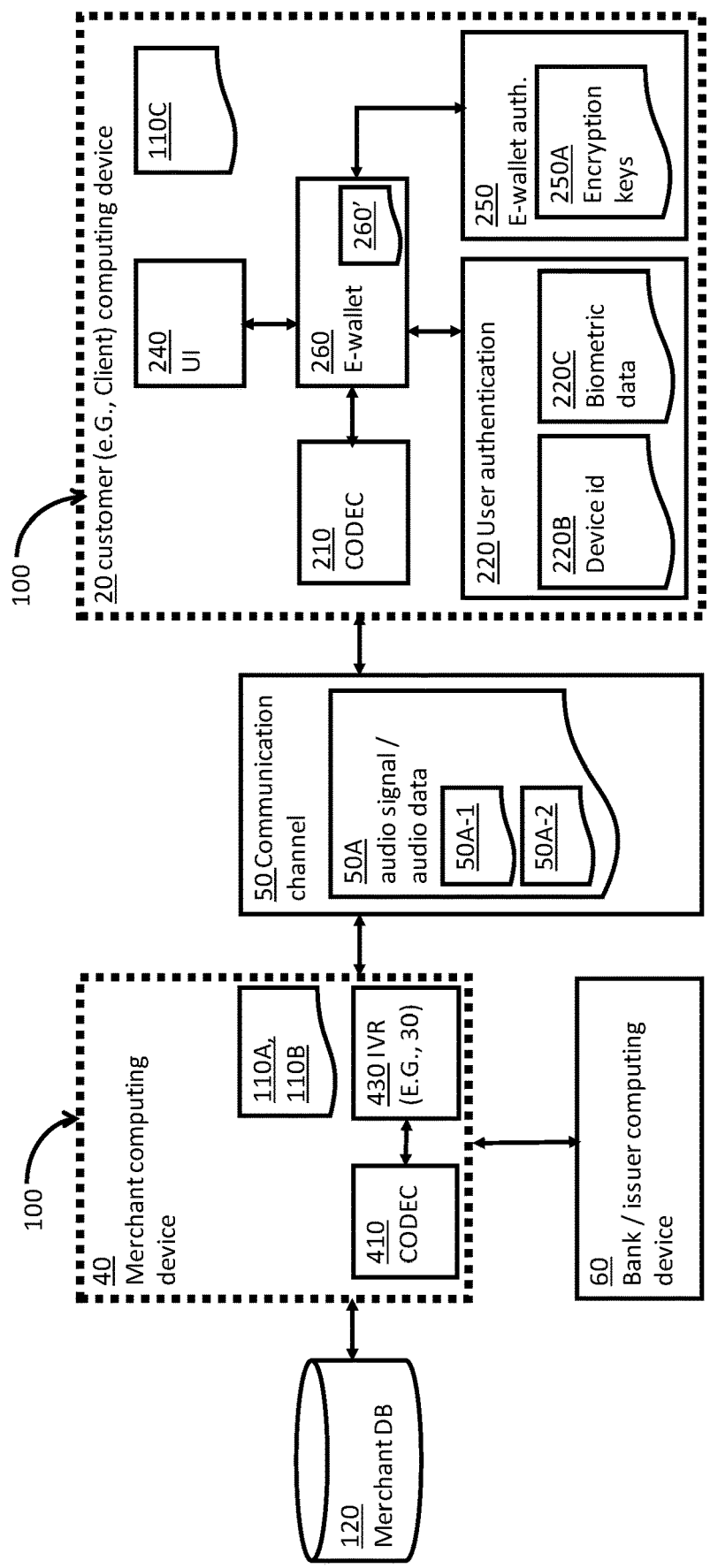

Reference is now made to FIGS. 2A, 2B and 2C which depict different examples for implementations of a system 100, that may create, manipulate and transmit computer data to perform secured transactions between nodes of a communication network, according to some embodiments of the invention. According to some embodiments of the invention, system 100 may be implemented on one or more computing devices such as element 1 of FIG. 1, that may be communicatively connected via a communication channel 50, thus forming a communication network. Each of the one or more computing devices may thus herein be referred to as a node in a communication network.

It may be appreciated that the non-limiting examples provided herein may include exchange of data elements between computing nodes as part of transactions such as monetary exchange transactions. Embodiments of the invention are not limited to such types of transactions, and may pertain to any type of exchange of computer data over a voice channel, e.g., as steganographic data, as elaborated herein.

It may be appreciated that the scope of system 100 may change according to a specific configuration, as depicted in each of the examples of FIGS. 2A, 2B and 2C. For the reader's convenience, components of system 100 in each of the examples of FIGS. 2A, 2B and 2C are marked by a broken line.

For example, as shown in FIG. 2A, system 100 may include at least one first computing device 20 that may be associated with a first user, at least one second computing device 40 that may be associated with a second user, and at least one third computing device interactive voice recognition (IVR) system 30. As shown in FIGS. 2B and 2C, system 100 may include the at least one first computing device 20 of the first user and the at least one second computing device 40 of the second user.

As depicted in the example of FIG. 2A, the second user may be a merchant or a supplier, that may be interested in selling goods or a service. Second computing device 40 may thus be referred to as a merchant device. In a complementary manner, the first user may be a client or a customer that may be interested in purchasing goods or a service from the merchant. Accordingly, first computing device 20 may be referred to as a customer or client device.

According to some embodiments, modules of system 100 may be implemented as software modules, hardware modules or any combination thereof. For example, devices 20, 30 and/or 40 may be or may include a computing device such as element 1 of FIG. 1, and may be adapted to execute one or more modules of executable code (e.g., element 5 of FIG. 1) to perform secured transactions in a communication network, as further described herein.

For example, device 20 may be adapted to execute at least one of modules 210, 220, 230 of FIG. 2B, 240, 250 and 260 as executable processes or tasks by at least one processor (e.g., element 2 of FIG. 1). Similarly, device 30 may be adapted to execute at least one of modules 310, 320 as executable processes or tasks by at least one processor 2, and device 40 may be adapted to execute at least one of modules 410, 430 as executable processes or tasks by at least one processor 2.

Additionally, or alternatively, one or modules included in devices 20, 30 and/or 40 (e.g., elements 210, 220, 230, 240, 250, 260, 310, 320, 410 and 430) may be implemented as hardware modules, and may collaborate with other modules of system 100 to perform secured transactions in a communication network, as further described herein.

According to some embodiments of the invention, the one or more nodes of system 100 may enable the first user (e.g., the client) and second user (e.g., a merchant) to use their computing devices (e.g., elements 20, and 40 respectively) such as smartphones to communicate over a voice channel 50. The term "voice channel" may be used herein as any communication channel adapted to convey an audio signal or audio data 50A between computing device 20 and computing device 40. For example, voice channel 50 may include a cellular voice channel, an analog voice channel, a voice over internet protocol (VoIP) channel, and the like. Accordingly, embodiments of the invention may, for example, enable the first user (e.g., the client) and second user (e.g., the merchant) to perform a voice call using their respective devices, exchange audio messages and/or audio files between their devices, and the like.

Embodiments of the invention may transfer, over a conventional voice channel 50, conventional audible voice data as an audio signal or audio data 50A-1. This audible voice data may describe a transaction such as a monetary exchange transaction (e.g., "I agree to pay you 50 Dollars"). As elaborated herein, embodiments of the invention may use voice recognition technology to extract information such as transaction request details 110A from that conventional voice data 50A-1, and encode this information as digital data 50A-2 (e.g., steganographic data 50A-2) which is also transmitted, in a manner that is not audibly detectable or noticeable by a human user, as part of audio data 50A over voice channel 50. In other words, audio data 50A or audio signal 50A may include some of the same information, in different ways (e.g., as part of 50A-1 and/or 50A-2), as elaborated herein.

According to some embodiments, digital data 50A-2 may be hidden, non-audio data that "piggybacks" on the digital voice data 50A.

Additionally, or alternatively, embodiments of the invention may encode into digital data 50A-2 one or more transaction data elements 110C such as authentication data elements 250, to facilitate a transaction between computing device 20 and computing device 40, as elaborated herein.

Embodiments of the invention may be adapted to facilitate, or to automatically create and exchange computer data regarding transactions, such as monetary exchange (ME) transactions, in which funds (e.g. financial currency) may be transferred from an account of a first user (e.g., a client or customer) associated with device 20 to an account of a second user (e.g., a merchant) associated with device 40, over voice channel 50, e.g., as part of a voice call between the first user and second user.

Embodiments of the invention may thus provide an improvement over currently available computer technology systems and methods of voice communication and computer-based transaction system technology: data that is conveyed between participants of a voice call may be included as details of an underlying transaction. The transaction may then be automatically consummated via the voice channel, without need to resort to other means of communication, and without need to establish another communication channel, other than the voice channel, between the participants. In other words, embodiments of the invention may enable users to perform a transaction in a streamlined fashion, on the voice channel, and based for example on the words that they have spoken. This is in contrast to the cumbersome, ubiquitous process of: (a) agreeing to details of a transaction on a phone conversation, and then (b) performing the transaction by entering a credit card number on the merchant's website via the Internet.

According to some embodiments, at least one processor 2 of computing device 40 may send one or more data elements 110A describing or pertaining to details of a transaction request (hereinafter transaction request details 110A) from computing device 40, via a voice channel 50 to computing device 20. Transaction request details 110A may include, for example a monetary sum to transfer, a number and/or timing of installments or payments, a currency to be used, and the like.

It may be appreciated that in some embodiments, the one or more transaction request details 110A may originate from computing device 40 and may be sent from computing device 40 to computing device 20. Additionally, or alternatively, as elaborated herein, the one or more data elements of transaction request details 110A may be produced by computing device 20 and may be sent from computing device 20 to computing device 40.

In some embodiments, computing device 40 may include a encoder/decoder (CODEC) module 410, adapted to encode data elements of transaction request details 110A into the audio signals that are conveyed between computing device 40 and computing device 20 during a voice call. As elaborated herein, CODEC module 410 may encode data elements of transaction request details 110A as steganographic data 50A-2 that may be included within audio data or audio signals 50A that may be transferred over voice channel 50 (e.g., as part of a phone conversation that may also include voice data 50A-1).

As known in the art, an abundance of methods exist for performing steganography over communicated data. Embodiments of the invention may employ steganography to communicate data elements pertaining to a transaction, such as transaction request details 110A, encryption keys 250, and the like as steganographic data 50A-2, over a voice signal or voice data element 50A in voice channel 50.

According to some embodiments, computing device 20 may receive the one or more data elements pertaining to transaction request details 110A from the computing device 40, via voice channel 50. Computing device 20 may include a CODEC module 210 that may correspond to CODEC module 410, in a sense that CODEC module 410 (of computing device 40) and CODEC module 210 may collaborate to transmit steganographic data 50A-2 as part of audio data 50A on one side of the communication, and extract the steganographic data 50A-2 from audio data 50A on the other side of the communication. It may be appreciated by a person skilled in the art that additional methods of communicating transaction related data (e.g., transaction request details 110A, encryption keys 250, etc.), as steganographic data, beyond those provided herein as examples may also be used.

For example, CODEC 410 may be adapted to include the data elements of transaction request details 110A as steganographic audio data, or a steganographic audio signal 50A-2 as part of audio signal or audio data 50A, e.g., in addition to voice data 50A-1, as known in the art. Computing device 40 may then transmit audio signal or audio data 50A, that may include the one or more transaction request details data elements 110A, to computing device 20, as audio data 50A over voice channel 50. In such embodiments, CODEC 410 may, for example, slightly change or modulate audio signal 50A to include or convey transaction request details 110A as steganographic data 50A-2 over voice channel 50.

In another example, voice channel 50 may be a voice over internet protocol (VoIP) channel. CODEC 410 may be adapted to transmit the one or more data elements of transaction request details 110A from computing device 40 to computing device 20 over voice channel as steganographic data 50A-2 in the VoIP data packets. In other words, CODEC 410 may be adapted to transmit transaction request details 110A as steganographic data 50A-2, on the same VoIP data packets that may be communicated over voice channel 50 to transfer the audio signal or audio data 50A of the conversation (e.g., voice data 50A-1) between the user of computing device 20 and the user of computing device 40. In such embodiments, CODEC 410 may, for example, use one or more least-significant bits (LSB) of a payload of packets of audio data 50A to include or convey transaction request details 110A as steganographic data 50A-2 over voice channel 50.

According to some embodiments, computing device 20 may include a CODEC module 210, adapted to receive the audio signal or audio data 50A (e.g., including the one or more transaction request details data elements 110A) from computing device 40 via voice channel 50. Computing device 20 may then extract the one or more transaction request details data elements 110A from audio data or audio signal 50A.

Pertaining to the same example, in a condition that CODEC 410 includes the data elements of transaction request details 110A as steganographic data, or a steganographic audio signal 50A-2 as part of, or in addition to audio signal or audio data 50A (e.g., in addition to voice data 50A-1), CODEC module 210 may extract the steganographic audio data or audio signal 50A-2 from audio signal or audio data 50A to obtain the one or more transaction request details data elements 110A.

As shown in FIG. 2A, computing device 20 may include an electronic wallet module 260. The term "electronic wallet" or "e-wallet" may be used herein to refer to a type of electronic component or module, which may be implemented by software, hardware or any combination thereof, and may be utilized (e.g., by a user) to perform online transactions through a computer or a smartphone such as computing device 20.

In some embodiments, e-wallet module 260 may be utilized as a payment card (e.g., a credit card or debit card), and may be linked with an individual's banking account to carry out payments. In such embodiments, e-wallet module 260 may be authenticated by a computing device 60 such as a server that may be associated with the bank account and/or with an issuer of the paying card, using authentication keys or encryption keys 250A.

According to some embodiments of the invention, computing device 20 may transmit at least one transaction data element 110C to computing device 40 via voice channel 50. The at least one transaction data element 110C may include, for example, one or more authentication data elements 250 (e.g., 250A), an identification of a paying card 260' associated with the electronic wallet 260, a user authentication data element 220 (e.g., 220B, 220C) as elaborated herein, and/or one or more transaction request details 110A. According to some embodiments, computing device 20 may be adapted to transmit the at least one transaction data element 110C as steganographic data, or a steganographic audio signal 50A-2 over voice channel 50.

For example, processor 2 of computing device 20 may transmit one or more transaction data elements 110C such as authentication data elements 250 (e.g., encryption keys 250A) of electronic wallet module 260 to computing device 40, via the voice channel. In some embodiments of the invention CODEC 210 of computing device 20 may transmit the one or more transaction data element 110C (e.g., authentication data elements 250, such as encryption keys 250A of the electronic wallet module 260) from computing device 20 to computing device 40 as a steganographic audio signal or audio data 50A, in addition to, or in combination with audio signal or audio data 50A, over voice channel 50.

In another example, voice channel 50 may be a voice over internet protocol (VoIP) channel. CODEC 210 may be adapted to transmit the one or more transaction data elements 110C (e.g., identification of a paying card 260', authentication data elements 250 of the electronic wallet module (e.g., 250A, 250A' 250B), user authentication data element 220), from computing device 20 to computing device 40 over voice channel 50 as steganographic data 50A-2 in the VoIP data packets. In other words, CODEC 210 may be adapted to transmit authentication data elements 250 as steganographic data 50A-2, on the same VoIP data packets that may be communicated over voice channel 50 to transfer the audio signal or audio data 50A of the conversation (e.g., voice data 50A-1) between the user of computing device 20 and the user of computing device 40. For example, CODEC 210 may use one or more least significant bits (LSBs) of the same VoIP data packets that are adapted to convey audio data 50A over voice channel 50, to encode therein, as steganographic data, the at least one transaction data element 110C.

According to some embodiments of the invention, computing device 40 may receive, via the voice channel, one or more data elements pertaining to authentication data elements 250 of electronic wallet module 260. CODEC module 410 may extract the steganographic audio data or audio signal 50A-2 from audio signal or audio data 50A to obtain the one or more transaction data elements 110C.

Computing device 20 may thus cooperate with computing device 40 to carry out or effect the requested transaction based on the extracted transaction request details 110A and the electronic wallet authentication data 250. For example, computing device 20 may transfer the one or more authentication data elements 250 (e.g., 250A, 250A' 250B) to computing device 40 so as to carry out or effect the requested transaction as a payment card transaction, or a cryptocurrency transaction, as elaborated herein.

As known in the art, an "issuing entity", or "issuer" may be a bank, or credit union that offers payment cards (e.g., credit cards) and extends credit limits to cardholders who qualify. When consumers make credit card purchases, the issuer is responsible for sending payments to merchants for purchases made with payment cards from that bank. In a similar manner, in relation to electronic wallets, an issuing entity may provide similar services of credit allowance and transfer of payments, to facilitate purchases by a holder of the electronic wallet.

As elaborated herein, computing device 60 may include, be controlled by, or be associated with, an issuing entity of electronic wallet 260. Additionally, or alternatively, computing device 60 may be a banking server that may handle a bank account of the user of computing device 20, that includes electronic wallet 260.

According to some embodiments, authentication data 250 may include an identification of issuing entity 60. For example, authentication data element 250 may include a Bank Identification Number (BIN) of the electronic wallet's 260 issuing bank. As known in the art, the BIN number of the electronic wallet module 260 may include an identification of issuing entity 60. Computing device 40 may receive authentication data element 250 via voice communication channel 50, as steganographic data 50A-2, as part of, or in addition to, audio signal or audio data 50A (e.g., in addition to voice data 50A-1). Computing device 40 may utilize or employ CODEC 410 as elaborated herein, to extract the identification of issuing entity 60 (e.g., the BIN number) from steganographic data 50A-2. Computing device 40 may thus obtain an identification of issuing entity 60 (e.g., a bank of issuance) of electronic wallet 260 from authentication data element 250, via voice communication channel 50.

According to some embodiments, computing device 40 may transmit or propagate one or more transaction data elements 110C such as authentication data element 250 (e.g., encryption key 250A) and/or at least one data element of transaction request details 110A to computing device 60. Computing device 40 may then cooperate with computing device 60 to transfer funds from a first account (e.g., a first banking account), associated with the user of computing device 20 (e.g., a client), to a second account (e.g., a second banking account), associated with the user of computing device 40 (e.g., a merchant) via computing device 60, based on the transaction request details 110A and the authentication data 250 (e.g., encryption key 250A).

In other words, a processor (e.g., element 2 of FIG. 1) of computing device 20 may be adapted to receive (e.g., from computing device 40), via voice channel 50, at least one data element comprising details of a transaction request 110A, is encoded within a first audio signal in the voice channel. Processor 2 may use CODEC module 210 to decode the audio signal, so as to extract the transaction request details 110A from the first audio signal, and transfer the extracted transaction request details to electronic wallet module 260. Electronic wallet module may respond with at least one authentication data element 250, based on transaction request details 110A, and/or based on results of a user authentication 220. For example, electronic wallet module 260 may provide authentication data element(s) 250 only if the result of the user authentication 220 (e.g., biometric authentication 220C) is successful. In another example, electronic wallet module 260 may provide authentication data element(s) 250 only if transaction request details 110A conform to a predefined policy or criterion (e.g., that a price or cost included in transaction request details 110A does not surpass a limit). Computing device 20 may then communicate the at least one authentication data element 250 to computing device 40, as a second audio signal 50A, or as digital data 50A-2 such as steganographic data within a second audio signal 50A, over voice channel, to carry out the requested transaction, as elaborated herein.

As known in the art, an acquirer entity, or an acquiring bank is a bank or financial institution that may process credit or debit payments on behalf of a merchant. The acquirer may allow merchants to accept credit card payments from the issuing banks within a credit association.

According to some embodiments, computing device 60 may communicate with an acquirer entity 60', such as an acquirer banking server 60' (which may, or may not be the same entity as element 60), to transfer payment from a first account associated with the user of computing device 20 (e.g., a client), to a second account, associated with the user of computing device 40 (e.g., a merchant).

It may be appreciated that computing device 40 may transfer the funds based on the authentication data 250 (e.g., 250A), in a sense that computing device 40 may utilize authentication data 250 to authenticate an identity of electronic wallet module 260 vis-a-vis computing device 60. In other words, transfer of funds may depend upon successful authentication of the electronic wallet module 260, using authentication data 250 (e.g., 250A). Additionally, computing device 40 may transfer the funds based on transaction request details 110A in a sense that the transferred funds may correspond to the information included in the transaction request details 110A (e.g., a sum of transfer, a number and/or timing of installments, a currency, and the like).

According to some embodiments, computing device 20 may include a user authentication module 220, adapted to provide one or more authentication factors associated with the user of computing device 20. For example, authentication module 220 may be adapted to produce an identification (e.g., an identification number) 220B corresponding to computing device 20. Computing device 20 may then send identification 220B to computing device 40, to signify that authentication data element 250 was sent from a computing device 20 that is associated with, or owned by a specific user. Subsequently, computing device 40 may transfer the funds based on identification 220B, in a sense that computing device 60 (e.g., an issuing server) may allow transfer of the funds only if identification 220B corresponds to the computing device 20 which includes electronic wallet module 260.

Additionally, or alternatively, authentication module 220 may be adapted to produce biometric data 220C (e.g., a fingerprint, an image of a user's face, a sample of a user's voice, etc.) so as to biometrically authenticate an identity of the user of computing device 20. Electronic wallet module 260 may then use biometric data 220C to biometrically authenticate the identity of the user of computing device 20. According to some embodiments, electronic wallet module 260 may send authentication data element 250 (e.g., encryption key 250A) based on the result of the biometric authentication. In other words, electronic wallet module 260 may only send encryption key 250A to computing device 40 if computing device 20 is currently used by the specific user, that is associated with, or owns electronic wallet module 260. Subsequently, computing device 40 may transfer the funds based on biometric data 220C, in a sense that computing device 60 (e.g., an issuing server) may transfer the funds only if biometric data 220C corresponds to the user who is associated with, or owns electronic wallet module 260.

According to some embodiments, e-wallet module 260 may be utilized as a pre-paid account, in which a user of computing device 20 may store their money for future online monetary exchange transactions or payments. For example, e-wallet module 260 may be configured to maintain one or more cryptocurrency cryptographic keys, to perform payment by transferring cryptocurrency (e.g., "Bitcoin", "Ethereum" and the like) from an account of a first user (e.g., a client or customer) associated with device 20 to an account of a second user (e.g., a merchant) associated with device 40.

In such embodiments, the one or more authentication data elements 250 of electronic wallet module 260 may include a cryptocurrency cryptographic key 250B. Computing device 20 may thus cooperate with computing device 40 to carry out the requested transaction based on the extracted transaction request details 110A and the electronic wallet authentication data 250 (e.g., cryptocurrency cryptographic key 250B), by transferring cryptocurrency funds from a first account, associated with the user of computing device 20 (e.g., a client), to a second account, associated with the user of computing device 40 (e.g., a merchant) based on the cryptographic key, as known in the art.

According to some embodiments of the invention, system 100 may include, or may be associated with one or more modules of an interactive voice recognition (IVR) system 30. For example, as shown in FIG. 2A, the one or more IVR modules 30 may be implemented on a computing device such as element 1 of FIG. 1, that is other than, or different from, computing device 20 (e.g., the customer device) and computing device 40 (e.g., the merchant device). In such embodiments, the one or more IVR modules 30 may be associated with the one or more computing devices 20 and/or 40, in a sense that IVR module 30 may be communicatively connected to computing devices 20 and/or 40 via communication channel 50.

Reference is now made to FIG. 2B, and FIG. 2C which depict additional examples for implementation of system 100, that may perform secured transactions between nodes of a communication network, according to some embodiments of the invention.

As depicted in FIG. 2B, IVR module 30 may be implemented on, or executed by computing device 20 (e.g., a customer device), where it is annotated as element 230. Additionally, or alternatively, as depicted in FIG. 2C, IVR module 30 may be implemented on, or executed by computing device 40 (e.g., a merchant device), where it is annotated as element 430. In such embodiments, the one or more IVR modules 30 (e.g., elements 230 and/or 430) may be associated with the one or more computing devices (e.g., elements 20 and/or 40, respectively) in a sense that the IVR module 30 may be executed by at least one processor (e.g., element 2 of FIG. 1), and may collaborate with other modules computing devices 20 and/or 40.

According to some embodiments, computing device 20 and computing device 40 may be or may include communication devices, such as smartphones that may enable their respective user to hold a voice call or conversation over voice channel 50.

As depicted in FIG. 2A, IVR module 30 may include a machine learning (ML) based, natural language processing (NLP) module 320. As part of IVR module 30, NLP module 320 may also be associated with at least one processor of computing device 20 and/or computing device 40, as elaborated above.

According to some embodiments, at least one processor (e.g., element 2 of FIG. 1, such as a processor of computing device 20 and/or computing device 40) may utilize ML based NLP module 320 to "tap" or "listen" to the audio data or audio signals 50A included in the conversation (e.g., voice data 50A-1) between the users of computing device 20 and computing device 40, and perform speech recognition on the audio data 50A (e.g., on voice data 50A-1).

According to some embodiments, ML based NLP module 320 may be adapted to determine a textual representation of the speech conveyed on voice channel 50. For example, a first user (e.g., a user of computing device 40, e.g., a merchant) may say, as part of a phone discussion with a second user (e.g., a user of computing device 20, e.g., a customer): "the toy truck costs 10 Dollars in three monthly installments". ML based NLP module 320 may be adapted to convert the spoken phrase into textual form. Pertaining to the same example, the textual form may be a string data element that includes: "the toy truck costs 10 Dollars in three monthly installments".

According to some embodiments ML based NLP module 320 may be configured to further analyze the recognized speech (e.g., the textual representation of the conversation) to extract transaction request details 110A. In other words, ML based NLP module 320 may analyze audio data 50A (e.g., voice data 50A-1) that is conveyed via voice channel 50, so as to extract the transaction request details 110A from audio data 50A, e.g. the meaning of voice data 50A-1.

Pertaining to the same example, NLP module 320 may extract information from the string data element, to produce a second data element such as a table, that includes transaction data request details 110A. In this example, the transaction data request details 110A data element may be a table that contains the following entries: (a) Product: Toy truck, (b) Cost: 10, (c) Currency: Dollars, (d) Payment type: monthly installments, and (e) Number of installments: 3.

It may be appreciated by a person skilled in the art that embodiments of the invention may apply slightly different methods of performing secured transactions over communication network or communication channel 50, as elaborated in the examples that follow, depending on the location of the one or more IVR modules 30.

Figure 3A:
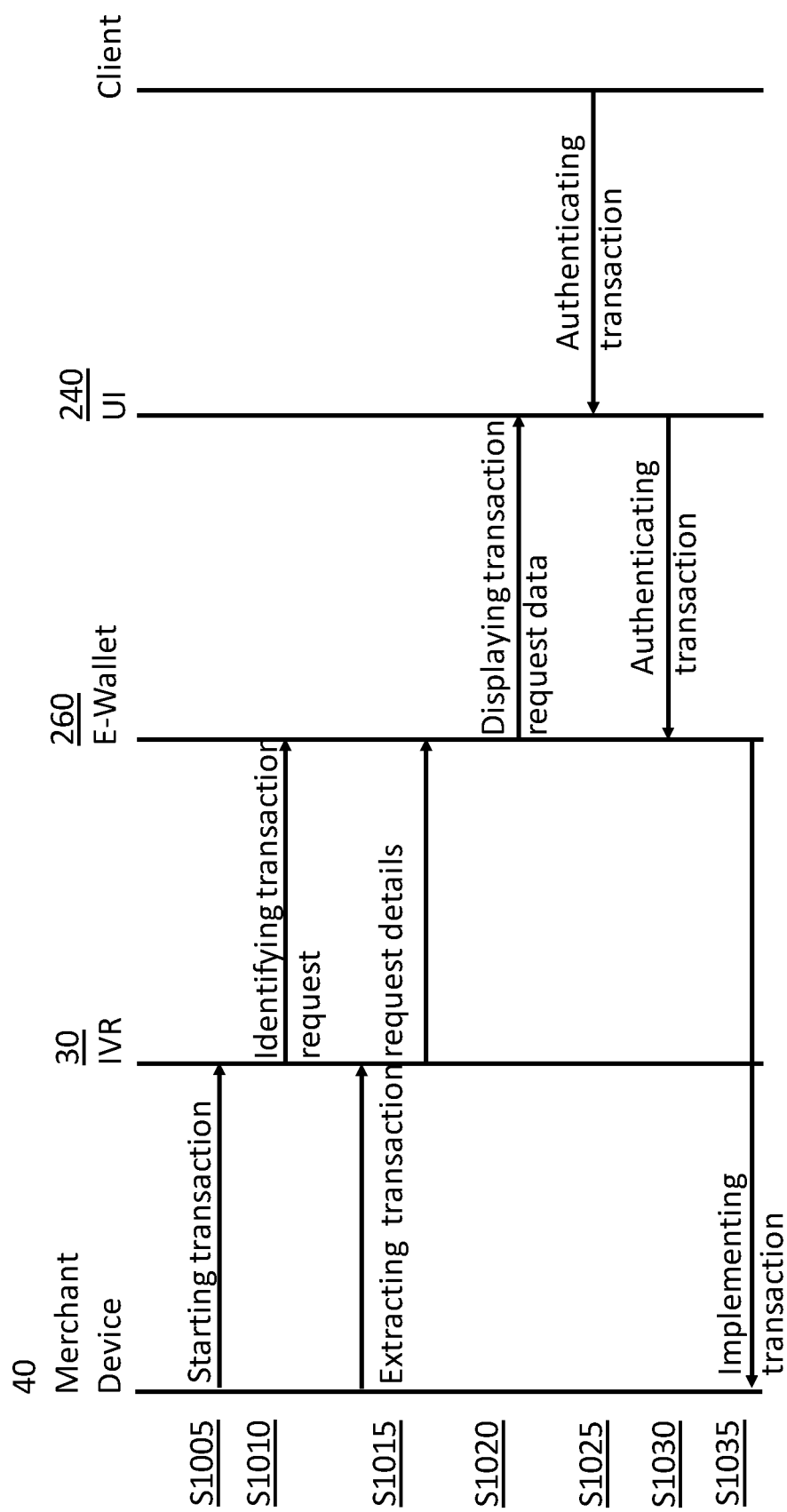

Reference is now made to FIG. 3A which is a communication diagram depicting an example of a scenario of exchanging computer data regarding a secured transaction between nodes of a communication network, according to some embodiments of the invention.

For example, in some embodiments such as depicted in FIG. 2C, ML based NLP module 320 may be included (as part of IVR module 430) in computing device 40, that may, for example be a smartphone that belongs to a merchant (e.g., a bicycle salesperson). The merchant may conduct a phone conversation with a potential client, who may be using a computing device 20 which may be a second smartphone. During the conversation, the merchant may discuss selling goods (e.g., a bicycle) to the client.

As shown in step S1005, the merchant may utilize computing device 40 to send an indication 110B of a forthcoming or future transaction request from computing device 40, to at least one of computing device 20 and IVR 30 via voice channel 50. As shown in step S1010, embodiments of the invention (e.g., at least one of computing device 20 and IVR 30) may receive and/or identify the forthcoming transaction request, and put electronic wallet 260 module and/or IVR 30 in, or transfer it to, a tapping or monitoring state, based on the received indication, so as to tap onto the voice channel, and extract the transaction request details. Additionally, as shown in step S1015, embodiments of the invention may extract transaction request details 110A, and propagate the details to e-wallet module 260.

For example, during a phone discussion, a user of computing device 40 (e.g., the bicycle salesperson) may verbally mention details of a transaction request 110A by saying (e.g., voice data 50A-1) to the user of computing device 20 (e.g., the client) for example: "the bicycle will cost $100 in three monthly installments". In preparation to saying the aforementioned sentence, the user of computing device 40 may use a UI (e.g., a touchscreen) of computing device 40 to send an indication 110B of a forthcoming transaction request to IVR 30. Computing device 40 may send indication 110B as steganographic data 50A-2 over voice channel 50, e.g., as part of audio data 50A. IVR 30 may receive indication 110B of the forthcoming transaction request and may subsequently transfer to a monitoring or tapping state, so as to identify the elements of transaction request details 110A (e.g., type of goods: bicycle, cost: 100, currency: Dollars, number of installments: 3 and timing of installments: each month, etc.) as spoken by the salesperson.

In another example, during a phone discussion, a user of computing device 40, and/or a user of computing device 20 may verbally emit a predefined word or phrase that may be an indication 110B of a forthcoming transaction request. IVR 30 may receive indication 110B via voice channel 50, and may subsequently transfer electronic wallet module 260, to a monitoring or tapping state, so as to receive upcoming data elements that may include information of transaction request details 110A.

In yet another example, during a phone discussion, a user of computing device 40 (e.g., the bicycle salesperson) may use a UI of computing device 40 to communicate (e.g., via a communication network such as a local area network (LAN) or the Internet), with a database 120 that may be associated with, or belong to computing device 40. For example, database 120 may include transaction details, such as a type of specific goods (e.g., a bicycle), a price and currency of the goods (e.g., $100), a number and timing of installments, etc. that may be offered by a user of computing device 40 (e.g., a merchant). The user of computing device 40 may thus obtain transaction request details 110A from database 120. In preparation to sending transaction request details 110A to computing device 20, the user of computing device 40 may use a UI (e.g., a touchscreen) of computing device 40 to send an indication 110B of the forthcoming transaction request, as steganographic data 50A-2, as part of audio data 50A over voice channel 50, to computing device 20, so as to signify the incoming transaction request details 110A to e-wallet module 260. Computing device 20 may receive indication 110B of forthcoming transaction request (e.g., sent from the UI of computing device 40), and may transfer electronic wallet module 260 into a tapping state, based on the received indication, so as to tap onto the voice channel, and extract the transaction request details.

In other words, following reception of indication 110B, electronic wallet module 260 may relate to upcoming data from computing device 40 as including transaction request details 110A.

According to some embodiments, IVR module 30 may be adapted to receive data that is conveyed over voice channel 50, such as voice data 50A-1 and/or steganographic data 50A-2, and extract therefrom relevant information, that is exchanged between computing devices 20 and 40. For example, IVR module 30 may be adapted to extract from voice channel 50 information that may be spoken verbally (e.g., voice data 50A-1) between users of computing devices 20 and 40, that pertains to monetary transactions between them, as elaborated herein.

As shown in FIG. 2A, IVR module 30 may include, or may be associated with a CODEC module 310 that may correspond to at least one of CODEC modules 210 and 410 of computing devices 20 and 40, respectively. CODEC module 310 may correspond to modules 210 and 410 in a sense that CODEC module 310 may collaborate with the at least one of CODECs 210 and 410 to transmit steganographic data 50A-2 as part of voice data 50A on one side of communication channel 50, and extract the steganographic data 50A-2 from voice data 50A on the other side of communication channel 50.

Additionally, or alternatively, IVR module 30 may include a ML-based NLP module 320, adapted to extract relevant information (e.g., information pertaining to monetary transactions) from data that is conveyed via voice channel 50, (e.g., as part of a phone conversation) as elaborated herein.

As shown in FIGS. 2A, 2B and 2C, IVR 30 may be included in one or more of computing device 20 or computing device 40. Additionally, or alternatively, IVR 30 may be implemented by, or included in a separate computing device 30. It may be appreciated that the implementation of steps S1005, S1010 and S1015 may vary according to the specific configuration of system 100, as depicted in FIGS. 2A, 2B and 2C, and as elaborated in the following examples.

For example, IVR 30 may be executed by a computing device (e.g., element 1 of FIG. 1) other than computing device 40 and computing device 20, for example as depicted in FIG. 2A. Computing device 20 and/or computing device 40 may be associated with IVR 30 (and/or with modules 310 and 320) in a sense that computing device 20 and/or computing device 40 may be communicatively connected with IVR 30 (e.g., via voice channel 50), in addition to their mutual connection. In such embodiments, indication 110B may be a call signal, adapted to join IVR 30 to the conversation (e.g., as in a conference call). IVR 30 may receive indication 110B, and may thus transfer to a monitoring mode, in which IVR 30 may be configured to tap into, or monitor voice channel 50 (e.g., the conversation). In this monitoring mode, IVR 30 may be adapted to extract transaction request details 110A by NLP module 320 from voice channel 50, e.g., from the conversation as spoken, and communicate transaction request details 110A, to CODEC 310. CODEC 310 may encode the extracted transaction request details as data elements 50A-2 within audio signal or audio data 50A, and may transmit audio signal 50A to via CODEC 310 to computing device 20. computing device 20 may in turn forward the transaction request details to electronic wallet module 260 for further processing, as elaborated herein.

In another example, in a condition that IVR 30 is executed by the same computing device as the client's computing device (e.g., element 20), for example as depicted in FIG. 2B, then indication 110B may be, for example, an audio signal, which may be purposefully produced by the user (e.g., the merchant) of computing device 40 by, for example, pressing a button on a UI of computing device 40, and/or emitting a specific phrase or word. In this case, indication 110B may be adapted to alert IVR 30 to "listen" to forthcoming details of a transaction request 110A that may be spoken as part of the conversation, or conveyed as voice data or a voice signal 50A-1 over voice channel 50. NLP module 320 of IVR 30 may subsequently extract transaction request details 110A from the conversation and may communicate transaction request details 110A to electronic wallet module 260 of computing device 20.

In yet another example, in a condition that IVR 30 is executed by the same computing device as the merchant's computing device (e.g., element 40), for example as depicted in FIG. 2C, then indication 110B may be, for example, an electronic signal, which may be purposefully produced by the user (e.g., the merchant) of computing device 40 by, for example, pressing a button on a UI of computing device 40, and/or by emitting a specific phrase or word. In this case, indication 110B may be adapted to alert IVR 30 to "listen" to forthcoming details of a transaction request 110A that may be verbally spoken as part of the conversation between the user of computing device 20 and the user of computing device 40, and may be conveyed as voice data 50A-1 or a voice signal 50A-1 over voice channel 50. NLP module 320 of IVR 30 may subsequently be configured to monitor voice channel 50, extract the spoken transaction request details 110A from the conversation on voice channel 50. NLP 320 may communicate transaction request details 110A to CODEC 410. CODEC 410 may in turn transmit transaction request details 110A to computing device 20 as steganographic data 50A-2, as part of audio data or audio signal 50A, in addition to voice data 50A-1, and may transmit audio signal 50A over voice channel 50. In other words, CODEC 410 of computing device 40 may encoding one or more data elements of transaction request details 110A within an audio signal 50A, and computing device 40 may transmitting the audio signal over voice channel 50 to computing device 20.

CODEC 210 of computing device 20 may subsequently extract the steganographic data 50A-2 (that includes transaction request details 110A) from audio signal or audio data 50A, and may forward the transaction request details 110A to electronic wallet module 260.

As shown in step S1020, e-wallet module 260 may collaborate with a user interface (UI, such as a touchscreen) 240, or any other output device (e.g., element 8 of FIG. 1) of computing device 20, and may present the transaction request details 110A on UI 240.

As shown in step S1025, UI 240 may prompt the user of computing device 20 to authenticate the requested transaction. For example, in step S1025, UI 240 may obtain one or more elements of user authentication 220 (e.g., biometric authentication data 220C), as elaborated above. Additionally, or alternatively, in step S1025, UI 240 may, for example, receive the user's consent, e.g. receive data representing the consent via user input, to the presented transaction request details, thus authenticating the transaction in a sense that the presented transaction request details 110A are, in fact, what the user of computing device 40 and the user of computing device 20 have agreed upon.

As shown in step S1030, UI 240 may propagate the one or more data elements of user authentication to e-wallet module 260. Pertaining to the above examples, in step S1030 UI 240 may transfer the one or more data elements of user authentication 220 (e.g., biometric authentication data 220C) and/or the user's consent to the presented transaction request details 110A to e-wallet module 260.

As shown in step S1035, e-wallet 260 may communicate with computing device 40 to implement, or carry out the transaction. In other words, e-wallet module 260 may transmit one or more authentication data elements 250 (e.g., encryption keys 250A and/or 250B) to computing device 40, as steganographic data 50A-2 via voice channel 50, and carry out the requested transaction based on transaction request details 110A and the electronic wallet authentication data 250. According to some embodiments, electronic wallet module 260 may transmit the one or more authentication data elements 250 to computing device 40 based on the user's consent (e.g., the transmission takes place only if the user has consented to the presented transaction request details 110A). Additionally, or alternatively, electronic wallet module 260 may transmit the one or more authentication data elements 250 to computing device 40 based on the data elements of user authentication 220 (e.g., biometric authentication data 220C), e.g., only if the biometric data is identified as pertaining to the user of computing device 20.

As elaborated above, embodiments of the invention may include various ways to carry out the requested transaction.

For example, computing device 40 may transfer encryption key 250A to a banking server, or an issuer server (e.g., element 60 of FIG. 2A), to authenticate the identity of e-wallet 260 and authorize transfer of funds from transferring cryptocurrency funds from a first account, associated with the user of computing device 20 (e.g., a client), to a second account, associated with the user of computing device 40 (e.g., a merchant) based on the cryptographic key. In some embodiments, authentication of e-wallet 260 vis-à-vis issuer server 60 may include additional steps, that may be required to prevent computing device 40 from knowing encryption key 250A. For example, issuer server 60 may communicate a server key (e.g., element 60' of FIG. 2A) to computing device 20, via computing device 40. Computing device 20 may calculate a value of a function (e.g., element 250A' of FIG. 2A, such as a value of an arithmetic function) of server key 60' and encryption key 250A. Computing device 20 may then respond by sending the calculated value 250A' back to issuer server 60, via computing device 40. Thus, computing device 40 may provide authentication of computing device 20 vis-à-vis issuer server 60, but may not be able to use encryption key 250A.

In another example, e-wallet 260 may transmit one or more authentication data elements 250 that are cryptocurrency encryption keys 250B. Computing device 20 and computing device 40 may subsequently collaborate to transfer cryptocurrency funds from a first account, associated with the user of computing device 20 (e.g., a client), to a second account, associated with the user of computing device 40 (e.g., a merchant) based on the cryptographic key, as known in the art.

Reference is now made to FIG. 3B which is a communication diagram depicting an example of an exchange of computer data between nodes of a communication network, regarding performance of secured transactions, according to some embodiments of the invention.

As shown in FIG. 3B, steps S2015 through S2035 may be substantially identical to steps S1015 through S1035 depicted in the example of FIG. 3A, and will not be repeated here for the purpose of brevity. The example of FIG. 3B may differ from that of FIG. 3A in the initiation of the scenario of the secured transaction.

As shown in step S2005, the client may utilize computing device 20 to send an indication 110B of a forthcoming transaction request from computing device 20, to at least one of computing device 40 and IVR 30 via voice channel 50.

As shown in step S2010, embodiments of the invention may identify the forthcoming transaction request, and put electronic wallet 260 module in or transfer it to a monitoring or tapping state, based on the received indication, so as to tap onto the voice channel, and extract the transaction request details. For example, during a phone discussion, a user of computing device 20 (e.g., a client) may verbally mention details of a transaction request 110A by saying, to the user of computing device 40 (e.g., a bicycle salesperson) for example: "the bicycle will cost $100 in three monthly installments". In preparation to saying the aforementioned sentence, the user of computing device 20 may send indication 110B of the forthcoming transaction request to put electronic wallet module 260 and/or IVR 30 module in a tapping state, so as to identify or extract the elements of transaction request details 110A (e.g., type of goods: bicycle, cost: $100, number of installments: 3 and timing of installments: each month) as spoken by the client.

It may be appreciated that the implementation of steps S2005, S2010 and S2015 may vary according to the specific configuration of system 100. However, these differences have been elaborated herein (e.g., in relation to FIG. 3A), and will not be repeated here for the purpose of brevity.

Figure 4A:
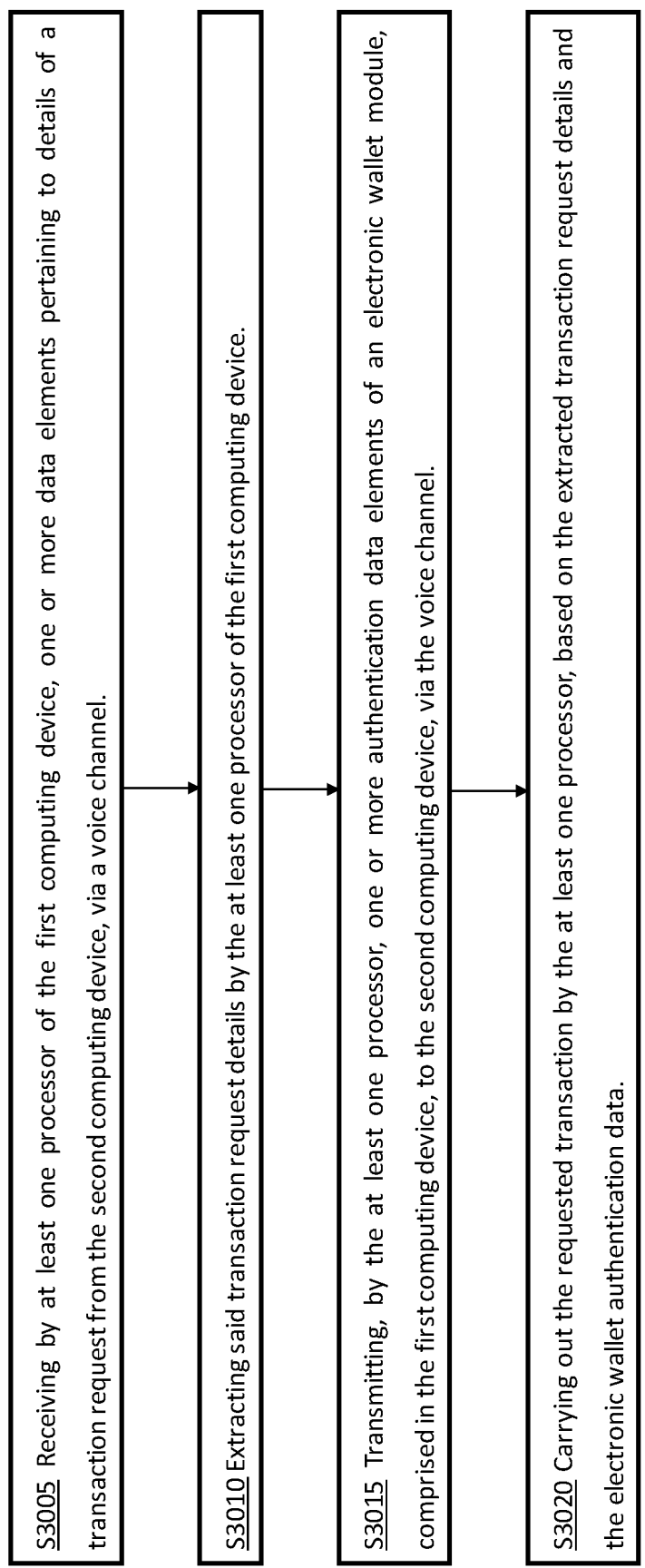
FIGS. 4A and 4B are flow diagram, depicting examples of methods of creating and exchanging computer data regarding performing secured transactions in a communication network, according to some embodiments of the invention.

Reference is now made to FIG. 4A which is a flow diagram according to embodiments of the invention. FIG. 4A depicts a method of creating and exchanging computer data regarding performance of secured transactions in a communication network, between a first computing device (e.g., element 20 of FIG. 2A), associated with a first user (e.g., a client or customer user), and at least one second computing device (e.g., element 40 of FIG. 2A) associated with a second user (e.g., a merchant user), according to some embodiments of the invention.

As shown in step S3005, at least one processor (e.g., element 2 of FIG. 1) of the first computing device 20, may receive one or more data elements pertaining to, or including details of a transaction request (e.g., element 110A of FIG. 2A) from the second computing device 40, via a voice channel. For example, computing device 20 and computing device 40 may be adapted to communicate audio data 50A over communication channel 50, and transaction request details 110A may be included in one or more audio data element 50A or audio signal 50A conveyed over voice channel data 50 (e.g., as steganographic data 50A-2, as elaborated herein).

As shown in step S3010, the at least one processor 2 may extract said transaction request details 110A from voice channel 50. Pertaining to the same example, processor 2 may be adapted to extract transaction request details 110A (e.g., steganographic data 50A-2) from the audio data 50A conveyed over communication channel 50.

As shown in step S3015, the at least one processor 2 may transmit one or more authentication data elements (e.g., elements 250 of FIG. 2A) of an electronic wallet module (e.g., element 260 of FIG. 2A) that is included in the first computing device 20, to the second computing device 40, via voice channel 50.

As shown in step S3020, the at least one processor 2 may carry out the requested transaction (e.g., the transaction, as requested or elaborated by transaction request details 110A) by the at least one processor 2, based on the extracted transaction request details 110A and/or the electronic wallet authentication data 250, as elaborated herein (e.g., in relation to FIG. 2A).

Figure 4B:
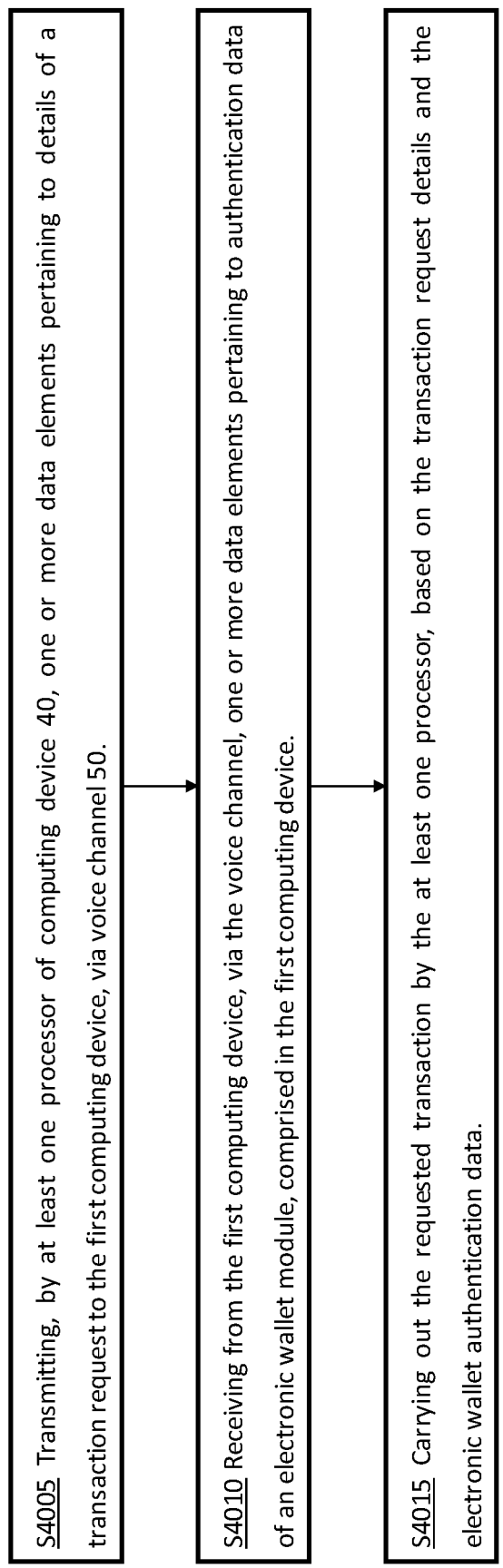

Reference is now made to FIG. 4B which is a flow diagram, depicting a method of creating and exchanging computer data regarding performance of secured transactions in a communication network, between a first computing device (e.g., element 20 of FIG. 2A), associated with a first user (e.g., a client or customer user), and at least one second computing device (e.g., element 40 of FIG. 2A) associated with a second user (e.g., a merchant user), according to some embodiments of the invention.

It may be appreciated that FIG. 4A may depict a method of exchanging computer data from the perspective of computing device 20, whereas FIG. 4B may depict a method of exchanging computer data from the perspective of computing device 40.

As shown in step S4005, at least one processor (e.g., element 2 of FIG. 1) of the second computing device 40, may transmit one or more data elements pertaining to details of a transaction request (e.g., element 110A of FIG. 2A) to the first computing device 20, via a voice channel.

As shown in step S4010, the at least one processor 2 of computing device 40 may receive, from the first computing device 20, via voice channel 50, one or more data elements pertaining to authentication data 250 of an electronic wallet module 260, included in the first computing device 20.

As shown in step S4015, the at least one processor 2 of computing device 40 may carry out the requested transaction (e.g., the transaction, as requested or elaborated by transaction request details 110A) based on the transaction request details 110A and the electronic wallet authentication data 250, as elaborated herein (e.g., in relation to FIG. 2A).

Embodiments of the present invention may effect a practical application, a technology platform analyzing, creating and transmitting data for performing secured transactions between two or more computing nodes or computing devices, over a voice channel, e.g., a communication channel adapted to communicate audio signals and/or audio data (e.g., for the purpose of oral conversation).

Embodiments of the present invention may include an improvement over currently available technology for performing transactions between computing nodes of a communication network, by conveying data that is spoken or discussed between participants of a voice, as details of an underlying transaction (e.g., a monetary transaction). The transaction may then be automatically consummated via the voice channel, without need to resort to other means of communication, and without need to establish another communication channel, other than the voice channel, between the participants.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of data communication between a first computing device, associated with a first user, and at least one second computing device associated with a second user, the method comprising:
receiving, by at least one processor of the first computing device associated with an encoder/decoder (CODEC) module and a natural language processing (NLP) module, an indication of a forthcoming transaction request from the second computing device, via a digital voice channel during a voice call between the first user and the second user;
transferring an electronic wallet module of the first computing device into a tapping state based on the received indication to enable tapping onto the digital voice channel, and extract transaction request details;
receiving, by the at least one processor of the first computing device, via the digital voice channel during the voice call, a first audio signal comprising first audible voice data elements and first non-audible digital data elements that piggybacks on the first audible voice data elements in a steganographic manner, wherein the first audible voice data elements comprise first transaction request details, and wherein the first non-audible digital data elements comprise second transaction request details;
extracting, by the at least one processor employing the NLP module, the first transaction request details from the first audible voice data elements;
extracting, by the at least one processor employing the CODEC module, said second transaction request details from the first non-audible digital data elements;
forwarding, by the at least one processor, the extracted first transaction request details and the extracted second transaction request details to the electronic wallet module; and
transmitting, by the at least one processor to the second computing device via the digital voice channel during the voice call, a second audio signal comprising second audible voice data elements and second non-audible digital data elements that piggybacks on the second audible voice data elements in a steganographic manner, wherein the second non-audible digital data elements comprise one or more authentication data elements of the electronic wallet module.

2. The method of claim 1, further comprising:
presenting the extracted first and second transaction request details on a user interface (UI) of the first computing device;
receiving the first user's consent to the presented first and second transaction request details via the UI; and
wherein the transmitting of the one or more authentication data elements of the electronic wallet module is based on the first user's consent.

3. The method of claim 2, further comprising biometrically authenticating an identity of the first user by the at least one processor, and wherein transmitting the one or more electronic wallet module authentication data elements to the second computing device is done based on the first user's consent, and further based on the first user's biometric identity authentication.

4. The method of claim 1, wherein the digital voice channel is a voice over internet protocol (VoIP) channel, and wherein the first audio signal is received and the second audio signal is transmitted via the digital voice channel using VoIP data packets.

5. The method of claim 1, wherein the digital voice channel is a VoIP channel using VoIP data packets.

6. The method of claim 1, further comprising carrying out the requested transaction comprising:
propagating at least one transaction data element from the second computing device to a third computing device, associated with an issuing entity of the electric wallet module; and
transferring funds from a first account, associated with the first user, to a second account, associated with the second user, via the third computing device, based on the at least one transaction data element,
wherein the at least one transaction data element is selected from a list consisting of: the first transaction request details, the second transaction request details, the one or more authentication data elements, and an identification of a paying card associated with the electronic wallet module.

7. The method of claim 1, wherein the one or more authentication data elements of the electronic wallet module comprises a cryptocurrency cryptographic key, the method further comprising carrying out the requested transaction by transferring cryptocurrency funds from a first account, associated with the first user, to a second account, associated with the second user, based on the cryptocurrency cryptographic key.

8. The method of claim 1, further comprising carrying out the requested transaction based on the extracted first and second transaction request details and the one or more electronic wallet module authentication data elements.

\* \* \* \* \*